Jan. 17, 1956 R. A. FINDLAY 2,731,468
SEPARATION OF ALKENYLPYRIDINES FROM ALKYLPYRIDINES
Filed June 12, 1953
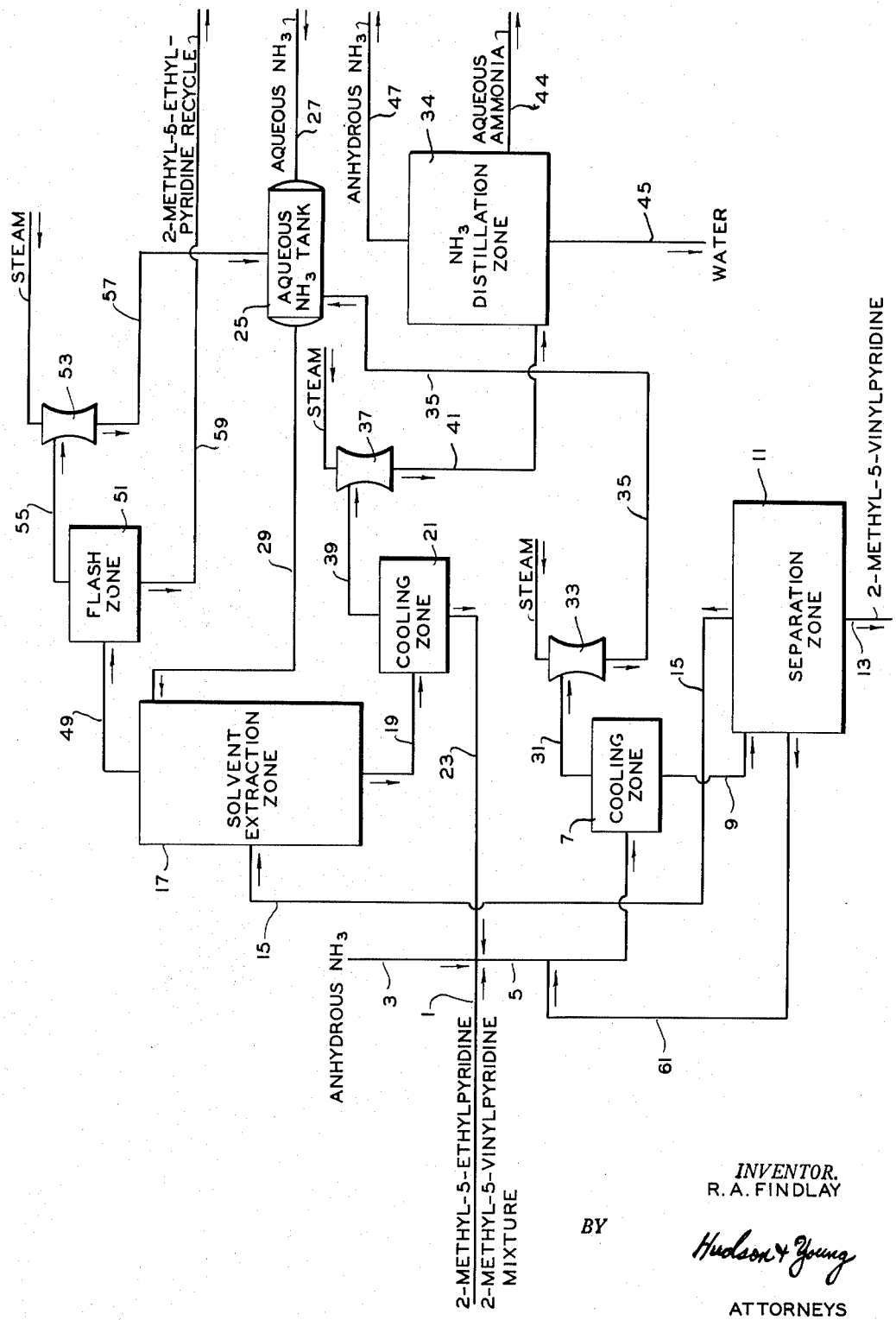
INVENTOR.
R. A. FINDLAY
BY
Hudson & Young
ATTORNEYS United States Patent Office 2,731,468
Patented Jan. 17, 1956

2,731,468

SEPARATION OF ALKENYLPYRIDINES FROM ALKYLPYRIDINES

Robert A. Findlay, Bartlesville, Okla., assignor to Phillips Petroleum Company, a corporation of Delaware Application June 12, 1953, Serial No. 361,230

9 Claims. (Cl. 260—290)

This invention relates to the purification of alkenylpyridines. In another aspect this invention relates to the separation and purification of alkenylpyridines from a mixture of alkenylpyridines and alkylpyridines. In another aspect this invention relates to the separation and purification of a vinylsubstituted pyridine from a mixture of the vinyl-substituted pyridine and the corresponding ethylpyridine. In a preferred embodiment, this invention relates to the separation and purification of 2-methyl-5-vinylpyridine from a mixture of 2-methyl-5-vinylpyridine and 2-methyl-5-ethylpyridine.

The production of alkenylpyridines, especially vinylpyridines, has recently become of much industrial importance. Vinylpyridines can be prepared by the condensation of formaldehyde with 2-, 4- and 6-methyl substituted alkylpyridines to form monoethylol pyridines followed by dehydration of same by heating to produce corresponding vinylpyridines or substituted vinylpyridines. A more direct procedure, and one which is probably the most important industrially, is the direct catalytic dehydrogenation of alkylpyridines to the corresponding alkenylpyridines. Thus, for example, 2-methyl-5-ethylpyridine can be efficiently dehydrogenated to produce the corresponding 2-methyl-5-vinylpyridine. This can be done, for example, by passing an admixture of from 2 to 15 weights of steam per weight of 2-methyl-5-ethylpyridine, at a temperature within the range of 1000 to 1300° F., at approximately atmospheric pressure, and a space velocity of 1 to 5 liquid volumes 2-methyl-5-ethylpyridine charged per volume of catalyst per hour, over a catalyst, exemplified by one composed of 93 per cent iron oxide, 5 per cent chromium oxide, and 2 per cent potassium hydroxide, as described in further detail in the copending application of John E. Mahan, Serial No. 244,469, filed August 30, 1951. The dehydrogenation effluent contains in addition to hydrogen, principally unchanged 2-methyl-5-ethylpyridine and 2-methyl-5-vinylpyridine product. Also present are small quantities of pyridine, 2-picoline, 3-picoline, 2,5-lutidine, 3-ethylpyridine and 3-vinylpyridine.

Purification of vinylpyridines contained in mixtures produced by the above described processes or other mixtures presents many difficulties. These arise because of the great ease with which vinylpyridines polymerize, the closeness of boiling points between vinylpyridine and their corresponding ethylpyridines, and the formation of water azeotropes and other difficultly separable fractions on fractional distillation of such mixtures. The process of this invention operates free of the difficulties from polymerization which are encountered in purification of vinylpyridines by fractional distillation as discussed by R. L. Frank, et al., I. E. C. 40, 879.

An object of this invention is to purify alkenylpyridines.

Another object of this invention is to separate and purify alkenylpyridines from admixture with alkylpyridines.

Another object of the invention is to purify vinylpyridines.

A further object is to separate an alkenylpyridine from admixture with the corresponding alkylpyridine.

Yet another object is to effect the separation and purification referred to above while minimizing polymerization of the alkenylpyridines.

A still further object is to purify 2-methyl-5-vinylpyridine. Further objects and advantages of the invention will be apparent to one skilled in the art from the accompanying disclosure and discussion.

I have discovered that purification of alkenylpyridines, for example the separation and purification of alkenylpyridines from alkylpyridines, can be effected most satisfactorily by subjecting an admixture of same to fractional crystallization, using anhydrous ammonia as an internal refrigerant. The alkenylpyridines freeze at higher temperatures than do their corresponding alkylpyridines, and thereupon are separable in a pure form, thus providing an excellent method for separation and purification. By an internal refrigerant I mean that anhydrous ammonia is introduced directly into the admixture of alkenylpyridines and corresponding alkylpyridines and produces refrigeration when said admixture is introduced to a zone of reduced pressure to flash the ammonia therefrom. This is in contrast to external refrigeration wherein said admixture is cooled by external means. The mother liquor resulting from the crystallization is subjected to conditions of solvent extraction with aqueous ammonia which, due to the greater solubility of alkenylpyridines in the aqueous ammonia, produces an extract which is enriched in said alkenylpyridines. The enriched extract is recycled, after being chilled, to the admixture of alkenylpyridines and alkylpyridines corresponding thereto to be crystallized and pure crystals of the alkenylpyridine are taken from a crystallization-separation zone.

An important advantage of this process will be apparent immediately to those skilled in the art in that the problem of polymerization of the alkenylpyridines is minimized, first of all, because the separation and purification process disclosed herein operates at low temperatures, which serves in itself to minimize polymerization. Secondly, ammonia which is present throughout my system has a retarding effect against polymer formation in alkenylpyridines.

This process of this invention is applicable to alkenylpyridines containing at least one alkenyl group having at least 2 carbon atoms, and in a preferred embodiment, to a separation and purification from alkylpyridines corresponding thereto. By "corresponding thereto" I mean alkylpyridines having the same number and molecular arrangement of carbon atoms. Di-, tri-, and tetralkenylpyridines, with the alkenyl substituents being present in various positions on the pyridine nucleus and wherein the double bond can be in a vinyl group or in the alpha position of the various possible positions in carbon chains of three and more carbon atoms in length, can be separated from corresponding alkylpyridines. 2-methyl-5-vinylpyridine and 2-methyl-5-ethylpyridine make up one group which it is frequently desired to separate in accordance with this invention. Other examples of alkenylpyridines which can be separated and purified from admixture with alkylpyridines corresponding thereto in accordance with my invention are, 2-vinyl-4-ethylpyridine, 2-ethyl-4-vinylpyridine, 2-vinylpyridine, 3-$\Delta'$-propenylpyridine and 2-$\Delta'$-pentenylpyridine. Usually the process of my invention is applied to those alkyl and alkenylpyridines containing a total of not over 10 carbon atoms in side chains and best results are customarily obtained with mixtures containing a monovinyl- or monopropenylpyridine and the corresponding ethyl or propylpyridine, with or without one or two methyl groups thereon.

It is known in the art that mixtures of alkenylpyridines and alkylpyridines, when subjected to cooling, form eutectic mixtures. The eutectic temperature of the system 2-methyl-5-vinylpyridine-2-methyl-5-ethylpyridine is −106.6° F., with the freezing point of pure 2-methyl-5-vinylpyridine being 10° F. and the freezing point of 2-methyl-5-ethylpyridine being −94° F. The effective limits on the temperature for the crystallization of 2-methyl-5-vinylpyridine according to my process are, therefore, below 10° F. and above −106.6° F. A preferred range of temperature, however, is about −30° F. to about −100° F.

As was stated heretofore, anhydrous ammonia is introduced into the admixture of alkenylpyridines and alkylpyridines corresponding thereto to act as an internal refrigerant. Said admixture containing the ammonia is subjected to conditions of reduced pressure thereby lowering the temperature, to form a crystal magma. Means for producing the conditions of reduced pressure are well known to the art, and steam jets and venturis are herein suggested. Accordingly, this condition of reduced pressure can be accomplished in a single stage or a plurality of stages, depending upon the degree of temperature lowering which is desired.

The crystal magma is transferred to a separation zone which can comprise the conventional steps for the separation of solid material from liquid material, such as, filtration, centrifuging, or otherwise. In such conventional separation methods the crystals are treated to remove occluded mother liquor and the purified product then removed. A preferred separation zone is a crystal purification column as disclosed by D. L. McKay in the copending application, Serial No. 367,424, filed July 14, 1953. This crystal purification column comprises a means whereby a small amount of molten product is supplied to the crystal mass as a countercurrent wash liquid thereby producing a purified product which is withdrawn from the bottom of the column.

An important feature of my invention involves the subjection of the mother liquor, resulting from the separation step, to conditions of solvent extraction with aqueous ammonia to produce an extract rich in the alkenylpyridine. Since methods and apparatus for obtaining intimate contact of two at least partially immiscible liquids are well known to the art, no detailed description thereof is required. A preferred solvent extraction zone is one involving continuous liquid-liquid contacting with countercurrent flow of the solvent. The extraction may be carried out in a single stage or a plurality of stages. Where a method of continuous countercurrent solvent extraction is used, the feed mother liquor can enter at an intermediate portion of the extraction tower while the solvent enters near the top of the extraction tower. I use aqueous ammonia for the solvent in the extraction tower since aqueous ammonia has a greater solubility for alkenylpyridines than for alkylpyridines and since ammonia has the attribute of retarding polymer formation in the alkenylpyridines.

The extract from the solvent extraction zone, which is rich in the alkenylpyridines, is subjected to conditions of reduced pressure to flash therefrom the ammonia and thereby chill the extract to near but above the freezing temperature of said extract. This condition of reduced pressure for chilling the extract can be produced in a single stage or a plurality of stages.

The proportions of the alkenylpyridines and alkylpyridines present in the admixture to be separated can vary widely. A preferred embodiment of my invention treats the effluent from the dehydrogenation of 2-methyl-5-ethylpyridine to produce 2-methyl-5-vinylpyridine and this effluent is a mixture containing principally about 30 to 40 per cent by weight of 2-methyl-5-vinylpyridine, about 60 to 70 per cent by weight of 2-methyl-5-ethylpyridine and small quantities of pyridine, 2-picoline, 3-picoline, 2,5-lutidine, 3-ethylpyridine and 3-vinylpyridine.

The accompanying drawing shows diagrammatically one arrangement of apparatus elements and flow of materials therethrough suitable for practicing my invention in a preferred modification. Various auxiliary items of equipment such as valves, pumps, etc., can be supplied by those skilled in the art and therefore have not been shown. It will be apparent that numerous modifications can be made of the specific details shown without departing from the invention.

An admixture of 2-methyl-5-vinylpyridine and 2-methyl-5-ethylpyridine to be separated and from which it is desired to recover purified 2-methyl-5-vinylpyridine is introduced via line 1 and anhydrous ammonia is introduced to the said admixture via line 3. The admixture containing anhydrous ammonia as an internal refrigerant is passed via line 5 to cooling zone 7, a zone of reduced pressure which chills said admixture to form a crystal magma. The crystal magma from cooling zone 7 is passed via line 9 to the separation zone 11 wherein the 2-methyl-5-vinylpyridine crystals are separated from the resulting mother liquor. Occluded mother liquor is washed free from the crystals and purified 2-methyl-5-vinylpyridine is withdrawn from the separation zone 11 via line 13. The mother liquor from the separation zone 11 is passed via line 15 to solvent extraction zone 17, where liquid-liquid contacting with the aqueous ammonia solvent in countercurrent flow produces an extract rich in the 2-methyl-5-vinylpyridine. The extract is passed via line 19 to cooling zone 21 where said extract is subjected to conditions of reduced pressure thereby chilling said extract to near but above its freezing temperature. The chilled extract is passed via line 23 back to the admixture of 2-methyl-5-vinylpyridine and 2-methyl-5-ethylpyridine, thereby enriching said admixture in 2-methyl-5-vinylpyridine.

The solvent for the extraction process is the aqueous ammonia made up in aqueous ammonia tank 25 to which is added ammonia via line 27 and ammonia-containing water via lines 35 and 57. The aqueous ammonia is passed from tank 25 to the solvent extraction zone 17 via line 29.

The condition of reduced pressure for cooling zone 7 is produced by a steam jet 33, in aspirating relation thereto, which flashes ammonia from said admixture via line 31 and the ammonia-containing water therefrom is passed via line 35 to the aqueous ammonia tank 25.

The condition of reduced pressure for cooling zone 21 is produced by a steam jet 37, in aspirating relation thereto, which removes ammonia from the extract produced by the solvent extraction zone 17 via line 19 to cooling zone 21 and the ammonia-containing water therefrom is passed via line 41 to an ammonia distillation zone 34.

The ammonia distillation zone 34 provides for the production of anhydrous ammonia which is taken overhead via line 47 and aqueous ammonia which is taken off via line 44. Water is removed from the ammonia distillation zone via line 45. The anhydrous ammonia can be recycled to this process where needed, e. g., to be added to the admixture of 2-methyl-5-vinylpridine and 2-methyl-5-ethylpyridine. Similarly, the aqueous ammonia can be recycled to the solvent extraction zone, or elsewhere in the process, as required.

The raffinate from the solvent extraction zone 17, which is rich in 2-methyl-5-ethylpyridine, is withdrawn from solvent extraction zone 17 via line 49 and passed to flash zone 51. A condition of reduced pressure is produced in flash zone 51 by a steam jet 53 which removes ammonia from the raffinate via line 55 and the ammonia-containing water therefrom is passed via line 57 to the aqueous ammonia tank 25. 2-methyl-5-ethylpyridine is withdrawn from flash zone 51 via line 59 to be recycled to the purification process, herein disclosed, or to the dehydrogenation process, as desired.

An alternative method of treating the mother liquor from the separation zone 11 is to remove a portion of said mother liquor as a side stream and recycle it via line 61 to the admixture of alkenylpyridines and alkylpyridines corresponding thereto, passing to the cooling zone 7 via line 5, and thereby further improve the efficiency of the crystallization-separation process.

The invention has been described with respect to various preferred embodiments thereof. However, there are numerous variations that can be made in the details herein given without departing from the invention. In this connection, I wish to emphasize that my process is effective to purify alkenylpyridines, broadly, without regard to the particular mixture in which the alkenylpyridines are found. For example, my process is effective to purify the alkenylpyridine produced by the dehydration of an alcohol compound referred to earlier herein.

I claim:

1. A process for resolving a mixture of an alkenylpyridine and an alkylpyridine corresponding thereto, said alkenylpyridine having at least one alkenyl group with the double bond in the alpha position and having from two to ten carbon atoms in side chains, which comprises, cooling said mixture with anhydrous ammonia as an internal refrigerant to produce crystals of one of said pyridines and to produce a mother liquor enriched in the other of said pyridines, and separating and recovering said crystals from said mother liquor.

2. A method for resolving an initial mixture of an alkenylpyridine and an alkylpyridine corresponding thereto, said alkenylpyridine having at least one alkenyl group with the double bond in the alpha position and having from two to ten carbon atoms in side chains, which comprises, cooling said mixture with anhydrous ammonia as an internal refrigerant to crystallize one of said pyridines, separating the resulting crystals from the resulting mother liquor, solvent extracting said mother liquor to produce an extract rich in said pyridine which is crystallized and a raffinate rich in the other of said pyridines and adding said extract to said initial mixture.

3. A process for resolving an initial mixture of an alkenylpyridine and an alkylpyridine corresponding thereto, said alkenylpyridine having at least one alkenyl group with the double bond in the alpha position and having from two to ten carbon atoms in side chains, said initial mixture forming a eutectic mixture and being rich in said alkenylpyridine, which comprises, cooling said mixture to crystallize said alkenylpyridine by adding anhydrous ammonia to said mixture and flashing said ammonia under conditions of reduced pressure, separating the resulting crystals of said alkenylpyridine from the resulting mother liquor, solvent extracting said mother liquor with aqueous ammonia to produce an extract rich in said alkenylpyridine and a raffinate rich in said alkylpyridine, chilling said extract and adding said chilled extract to said initial mixture to enrich said initial mixture in said alkenylpyridine.

4. A process for resolving an initial mixture of 2-methyl-5-vinylpyridine and 2-methyl-5-ethylpyridine which form an eutectic mixture, said initial mixture being rich in said 2-methyl-5-vinylpyridine, which comprises, cooling said mixture with anhydrous ammonia as an internal refrigerant to produce crystals of said 2-methyl-5-vinylpyridine and a mother liquor, separating said crystals from said mother liquor, solvent extracting said mother liquor with aqueous ammonia to produce an extract rich in 2-methyl-5-vinylpyridine and a raffinate rich in 2-methyl-5-ethylpyridine, cooling said extract and adding said cooled extract to said initial mixture to enrich said initial mixture in said 2-methyl-5-vinylpyridine.

5. A process for the separation and recovery of a vinylpyridine from a feed mixture comprising the reaction products of the catalytic dehydrogenation of an ethylpyridine corresponding to said vinylpyridine, said vinylpyridine having from two to ten carbon atoms in side chains, which comprises, cooling said feed mixture with anhydrous ammonia as an internal refrigerant to produce crystals of said vinylpyridine and a mother liquor, separating said crystals from said mother liquor, solvent extracting said mother liquor with aqueous ammonia to produce an extract rich in said vinylpyridine and adding said extract to said feed mixture to enrich said feed mixture in said vinylpyridine.

6. A process for the separation and recovery of 2-methyl-5-vinylpyridine and 2-methyl-5-ethylpyridine from a feed mixture of 2-methyl-5-vinylpyridine and 2-methyl-5-ethylpyridine, said feed mixture having more than about 30 weight per cent 2-methyl-5-vinylpyridine, which comprises, adding anhydrous ammonia derived as hereinafter recited to said feed mixture, cooling said feed mixture under conditions of reduced pressure in a cooling zone produced as hereinafter described to produce crystals of 2-methyl-5-vinylpyridine and a mother liquor enriched in 2-methyl-5-ethylpyridine, separating and recovering said crystals of 2-methyl-5-vinylpyridine, solvent-extracting said mother liquor in a solvent extraction zone with an aqueous ammonia solvent derived as hereinafter recited to produce an extract rich in 2-methyl-5-vinylpyridine and a raffinate rich in 2-methyl-5-ethylpyridine, separating and recovering said 2-methyl-5-vinylpyridine from said raffinate, adding said extract to said feed mixture, producing said conditions of reduced pressure in said cooling zone by passing a jet of steam in aspirating relation to said cooling zone to produce an ammonia-containing water, passing said ammonia-containing water through an ammonia distillation zone to produce anhydrous ammonia and aqueous ammonia, passing said anhydrous ammonia to said feed mixture to be added thereto as hereinbefore recited, and passing said aqueous ammonia to said solvent extraction step as the solvent therefor as hereinbefore recited.

7. A process for the separation and recovery of 2-methyl-5-vinylpyridine from a feed mixture of 2-methyl-5-vinylpyridine and 2-methyl-5-ethylpyridine, said feed mixture having more than about 30 weight per cent 2-methyl-5-vinylpyridine, which comprises cooling said feed mixture to crystallize the 2-methyl-5-vinylpyridine therein by adding anhydrous ammonia to said feed mixture and subjecting said feed mixture to conditions of reduced pressure in a first cooling zone, separating the resulting crystals of 2-methyl-5-vinylpyridine from the resulting mother liquor, passing said mother liquor to a solvent extraction zone and therein subjecting said mother liquor to liquid-liquid countercurrent flow solvent extraction with aqueous ammonia to produce an extract rich in 2-methyl-5-vinylpyridine and a raffinate rich in 2-methyl-5-ethylpyridine, subjecting said extract to conditions of reduced pressure in a second cooling zone to cool said extract to a temperature near but above the freezing temperature of said extract, adding the cooled extract to said feed mixture, producing said conditions of reduced pressure in said cooling zone by passing a jet of steam at high velocity in aspirating relation to said cooling zones whereby the steam takes up ammonia from said cooling zones and forms an ammonia-containing water, fractionating said ammonia-containing water in a ammonia distillation zone to produce anhydrous ammonia in the overhead and aqueous ammonia in the bottoms of said ammonia distillation zone, passing the anhydrous ammonia thus produced to said feed mixture and passing the aqueous ammonia thus produced to said solvent extraction zone.

8. The method of claim 7 wherein the said feed mixture of 2-methyl-5-vinylpyridine and 2-methyl-5-ethylpyridine comprises 2-methyl-5-vinylpyridine in the range of about 30 to 40 per cent by weight and 2-methyl-5-ethylpyridine in the range of about 60 to 70 per cent by weight and wherein said feed mixture and added extract from said solvent extraction are cooled by flashing ammonia therefrom under reduced pressure to a temperature in the range of below 10° F. to above −106.6° F.

9. The method of claim 7 wherein the said feed mixture of 2-methyl-5-vinylpyridine and 2-methyl-5-ethylpyridine comprises 2-methyl-5-vinylpyridine in the range of about 30 to 40 per cent by weight and 2-methyl-5-ethylpyridine in the range of about 60 to 70 per cent by weight and wherein said feed mixture and added extract from said solvent extraction are cooled by flashing ammonia under reduced pressure to a temperature in the range of about −30° F. to about −100° F.

References Cited in the file of this patent

UNITED STATES PATENTS

| | | |
|---|---|---|
| 2,413,674 | Weir | Dec. 31, 1946 |
| 2,435,792 | McArdle et al. | Feb. 10, 1948 |
| 2,611,769 | Hays | Sept. 23, 1952 |
| 2,659,763 | Humphreys et al. | Nov. 17, 1953 |